United States Patent [19]

Hardy et al.

[11] Patent Number: 5,623,546
[45] Date of Patent: Apr. 22, 1997

[54] ENCRYPTION METHOD AND SYSTEM FOR PORTABLE DATA

[75] Inventors: Douglas A. Hardy, Mesa; Craig R. Fossey, Scottsdale; Craig R. Balogh, Mesa; Steven R. Tugenberg, Scottsdale, all of Ariz.

[73] Assignee: Motorola, Inc., Schaumburg, Ill.

[21] Appl. No.: 494,129

[22] Filed: Jun. 23, 1995

[51] Int. Cl.⁶ .................................. H04L 9/32; G06F 3/06
[52] U.S. Cl. ............................... 380/4; 380/21; 380/25
[58] Field of Search ............................... 380/4, 21, 25

[56] References Cited

U.S. PATENT DOCUMENTS

| | | | |
|---|---|---|---|
| 4,683,968 | 8/1987 | Appelbaum et al. | 380/4 |
| 4,944,008 | 7/1990 | Piosenka et al. | 380/46 |
| 5,060,263 | 10/1991 | Bosen et al. | 380/25 |
| 5,150,407 | 9/1992 | Chan | 380/4 |
| 5,214,698 | 5/1993 | Smith, Sr. et al. | 380/21 |
| 5,384,847 | 1/1995 | Hendrickson et al. | 380/23 |
| 5,469,564 | 11/1995 | Junya | 380/4 X |

*Primary Examiner*—Gilberto Barrón, Jr.
*Attorney, Agent, or Firm*—Frank J. Bogacz

[57] ABSTRACT

A system and method allows portable, encrypted data to be accessible through multiple hosts, including new hosts (14), without requiring a secure link to the new hosts. A split key encryption system encrypts (52) data and stores the encrypted data on a portable device (10). A split of the encryption key is stored (54) in the portable device (10), and another split of the key is stored (54) in a home host (12). A password-modified key is then made (58) by combining a password with the encryption key. This password-modified key is then reduced (58), with one split being stored on the host (12) and another split stored on the portable device (10). Data can be accessed with a new host (14) by transferring (78) the host password-modified split to the new host (14) and entering (80) the password into the portable device (10).

18 Claims, 3 Drawing Sheets

ENCRYPTION METHOD AND SYSTEM FOR PORTABLE DATA

FIELD OF THE INVENTION

This invention relates in general to the field of data encryption and security, in particular to key encrypted data and more particularly to portable key encrypted data.

BACKGROUND OF THE INVENTION

Data security is of vital importance in today's computer based society. A variety of encryption techniques are available to protect data from unwanted access. Specifically, key encryption techniques provide a significant level of security. Only persons with the proper key can decrypt the stored information and use the data. However, these techniques require that the encryption key be guarded carefully.

Split key systems help insure key secrecy. In split key systems an encryption key variable is used to encrypt the data. The key is then split, reduced, or otherwise manipulated, into independent portions called splits, and the original key is then destroyed. The action of splitting a key is referred to as reducing herein to avoid confusion with the end result of reduction (i.e. splits). A key may be reduced through any of a variety of mathematical operations which render the resulting splits virtually useless apart from one another but which allow the splits to be combined to recreate the original key.

In a split key system, one split is stored in host equipment, typically a large computer, and the other split is stored elsewhere, such as in a removable and portable device. The portable device and host equipment need to be brought together to decrypt the data because neither the host nor the portable device has the key information necessary to decrypt the data on its own. When the portable device and the host equipment are combined, the key can be regenerated from the splits, the stored information may be decrypted, and operations that use the encrypted data may be performed.

Some types of equipment grant access to multiple portable devices. This is accomplished by having the host equipment contain a number of different splits of the key. Any portable device having an appropriate split to match one of the host splits can then be used to access the encrypted data. Likewise, some portable devices store multiple splits, allowing them to be used to access separate databases stored on different host equipment.

It would be desirable if a portable device stored the encrypted data in addition to a split, and it would be further desirable if the portable device could perform encryption and decryption processing. For example, the encrypted data might be stored on a removable, portable device, such as a laptop computer, PCMCIA card, secure telephone access key, or other portable computing device. This would allow the data to be taken and used at various different hosts.

However, this arrangement poses a security problem. The number of hosts that can be used are limited to those that have been prearranged to include an appropriate split for creating an encryption key. Otherwise, a new host might have no way to access the decrypted data. A new host is a host that does not already contain a proper host key split of the encryption key.

An appropriate host split could be transferred to the new host, but this unfortunately entails a great security risk. If an attacker intercepted the host split, the attacker could then access the data stored on the portable device. To set up a new host, a secure channel might transmit an appropriate split to the new host. Unfortunately, the secure channel requirement severely limits the number of hosts that can be established for accessing the portable device's encrypted data. This is a significant drawback for situations that require encrypted data be available upon a multitude of hosts. Moreover, in some situations the portable device may be used to establish a secure channel. Consequently, the secure channel will not already be established when the new host split needs to be transmitted to the new host.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides a system and method for allowing portable encrypted data to be accessed through multiple hosts, including new hosts, without requiring a secure link to the new hosts. A split key encryption system encrypts data and stores that data on a portable device. The portable device may, for example, be configured as a PCMCIA card or a secure telephone access key. One split of the encryption key is stored in the portable device, and another split of the key is stored in the home host. A password-modified key is then made by combining a password with the encryption key. This password-modified key is then reduced, with one split from the reduction being stored on the host and another split from the reduction being stored on the portable device. When the portable device is connected to a new host, one that does not have a corresponding new host split, the data can still be accessed using the password-modified key.

First, the host split of the password-modified key is transferred to the portable device at the new host. The portable device then asks for the password. If the correct password is entered, then the encryption key can be recreated using the password, the host password-modified key split, and the portable device password-modified key split. This allows access to the data through the new host.

Thus, data transferred from the home host are not configured as an encryption key or a split of the encryption key which could be combined with a portable device split to decrypt data stored on the portable device. Rather, the data transferred from the home host are configured as a password-modified split. If an attacker intercepts the transfer of the password-modified split, the attacker is unable to access the encrypted data because the attacker would not possess the password. Consequently, the transfer of the host password-modified split need not occur over a secure line.

A password authentication feature is provided to prevent unauthorized users from creating their own access rights. This password authentication feature prevents the system from being subject to an unauthorized person gaining access to the host splits and thereby gaining access to sensitive data upon the portable device.

Figure 1:
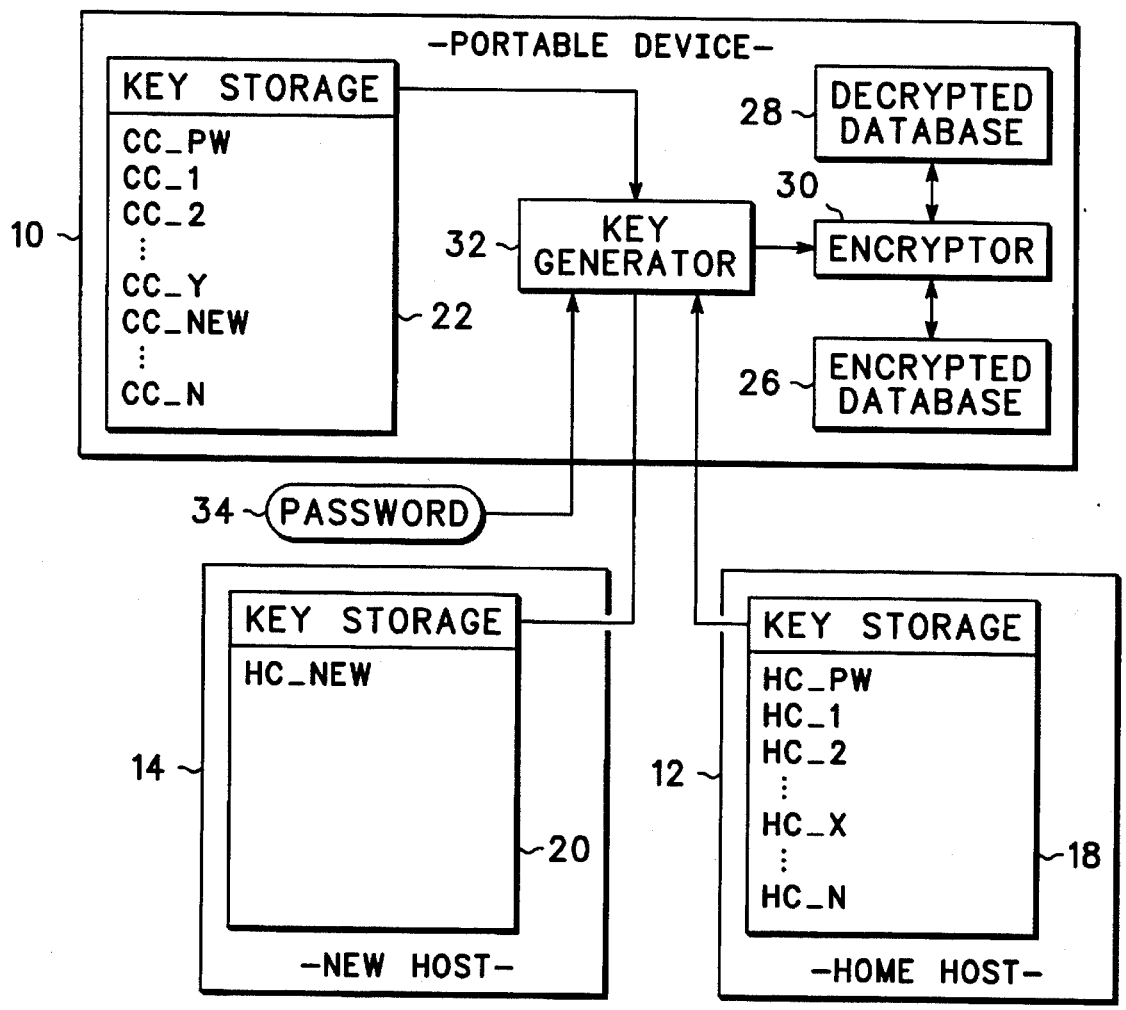
FIG. 1 is a block diagram depicting data flow in a data encryption system.

Turning now to the figures for a more detailed description of the drawings, FIG. 1 is a block diagram of a data encryption system which details data flow. The data encryption system includes a portable device 10, a home host 12, and a new host 14. The portable device 10 can be any device capable of storing data, such as a disk, tape, PCMCIA card, secure telephone access key, or portable computer. Home host 12 can be any device capable of interfacing with the portable device, such as a computer or secure telephone. New host 14 may be similar to home host 12, except that new host 14 has not yet been initialized to work with portable device 10.

Hosts 12 and 14 and portable encryption device 10 work together in a split key encryption system. Portable device 10 stores portable splits and the hosts storing host splits. As will be further explained below, home host 12 is any host that contains the home host password-modified split. Likewise, any host that contains a current host split is a current host. New host 14 is a host in the process of being initialized as a current host.

Home host 12 contains a key storage memory area 18. In key area 18, home host 12 stores various splits (HC_1, HC_2 . . . HC_N) that correspond to various portable devices 10 with which home host 12 has been initialized to work. Key area 18 of the home host also stores home host password-modified splits (HC_PW). Likewise, new host 14 contains a key storage memory area 20.

Portable device 10 contains a key storage memory area 22. In key area 22 portable device 10 stores various portable device splits (CC_1, CC_2 . . . CC_N) that correspond to various hosts 12 and 14 that have been initialized as current hosts. Key area 22 also stores a portable device password-modified split (CC_PW).

Portable device 10 also has a memory area to store an encrypted database 26. Desirably, the area where encrypted database 26 resides is configured as non-volatile memory so that in the event of power loss to portable device 10 encrypted database 26 will not be lost. The data stored in database 26 could be any type of sensitive information. For example, the data could be cryptographic algorithms or key variables which might be used to set up secure communication or device authentication.

In the embodiment shown, portable device 10 also contains a decrypted database memory area 28. Memory area 28 is used to store the data from database 26 after the data have been decrypted and while the data are to be used. Desirably, memory area 28 is configured as volatile memory so that no decrypted copy of the data remains available after power has been removed from portable device 10. However, portable device 10 need not rely exclusively upon the volatile nature of memory area 28 to insure that decrypted versions of sensitive data are unnecessarily available within portable device 10. Desirably, portable device 10 includes processes to wash memory area 28 whenever the decrypted data are not in use.

In the embodiment shown, portable device 10 also contains an encryptor 30 in data communication with databases 26 and 28 and a key generator 32 in data communication with encryptor 30. However, the functions performed by encryptor 30 and key generator 32 may alternatively be accomplished elsewhere, such as on a host 12 or 14. Encryptor 30 is a conventional encryption/decryption device capable of performing encryption and decryption using an encryption technique which is suitable for the application. DES represents one well known encryption technique, and those skilled in the art are aware of other techniques. Encryptor 30 uses the encryption key to encrypt data and store it in the encrypted database 26. Likewise encryptor 30 decrypts the encrypted data for storage in decrypted database 28 and subsequent access.

Key generator 32 performs a multitude of key-related operations, including reducing encryption keys into home and portable splits. Key generator 32 also creates the password-modified key by combining the encryption key with a user-entered password 34. Key generator 32 then reduces the password-modified key into a home host split (HC_PW) and a portable split (CC_PW). Key generator 32 also serves to recreate the key from the password-modified splits.

Setting up new host 14 as a current host entails transferring the HC_PW from home host 12 and having the user enter the password. From the HC_PW and user-entered password, key generator 32 recreates the encryption key. The encrypted data stored in encrypted database 26 can then be accessed. To set up the new host 14 as a current host for future use, a new split is produced, with a new host split (HC_NEW) stored in new host 14 and a new portable device split (CC_NEW) stored in portable device 10. This initialization of new host 14 allows the data to be accessed on future occasions without having to transfer the home host password-modified split (HC_PW) and without having to enter the password.

The various operations performed by the system illustrated in FIG. 1 will be discussed in more detail with respect to FIGS. 2–5. Also, in the following discussion of FIGS. 2–5, the operations of combining, reducing, and recreating the encryption key are described using the operation of exclusive ORing the various items. Those skilled in the art will recognize that other equivalent methods may have similar mathematical properties and might be used to achieve an equivalent result.

Figure 2:
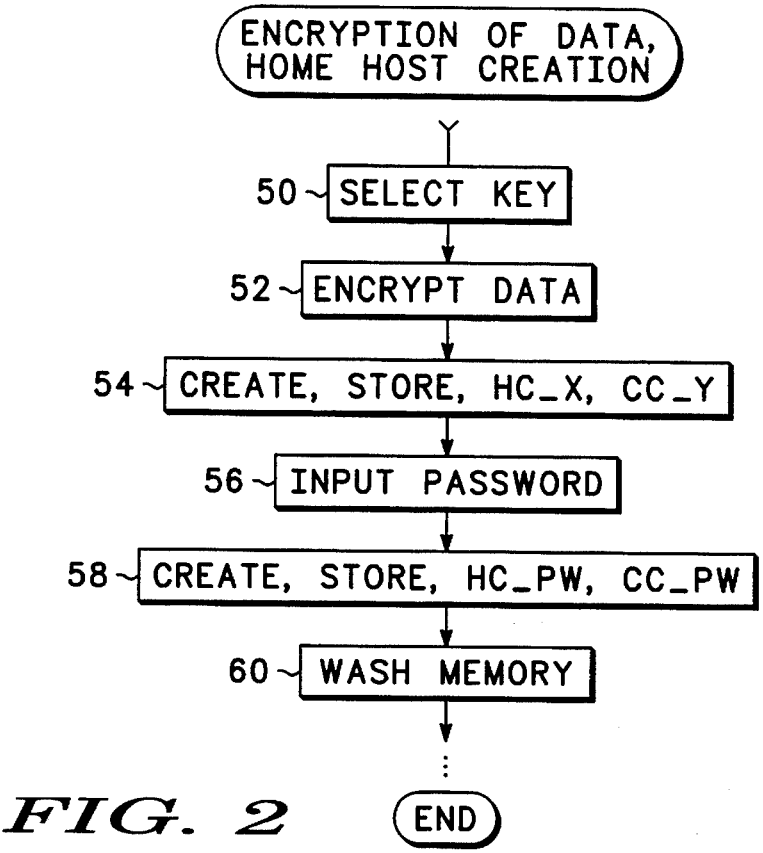
FIG. 2 is a flow diagram illustrating an encryption and host creation process.

Turning now to FIG. 2, a flow diagram illustrating an encryption and host creation process is shown. This flow diagram illustrates an exemplary embodiment of a process for setting up encrypted data and creating a home host. This operation is performed to initialize portable device 10 to work with home host 12 as a current host. Also, this operation sets up the system to allow the initialization of new hosts as current hosts at a later time.

In a first task 50, key generator 32 selects an encryption key. The exact nature of the key depends upon the nature of the encryption algorithm to be used. In a typical use, the key would be a random binary number having a substantial number of bits. After task 50, a task 52 obtains and encrypts the data to be used as a portable, secure database. Task 52 then stores the encrypted data in encrypted database 26 (see FIG. 1).

Next, a task 54 reduces the encryption key (KEY) into resulting splits, which are then stored in key storage areas 18 and 22 (see FIG. 1). A host split, represented by HC_X, where X is a number representing portable device 10, is created and stored in host 12. Likewise, a portable split, represented by CC_Y, where Y is a number representing this host 12, is stored in portable device 10.

The process of reducing the encryption key into HC_X and CC_Y splits typically involves:

1. Picking a random binary number, and assigning that random binary number to be HC_X, and
2. Performing the mathematical operation of $HC\_X \oplus KEY = CC\_Y$, (where $\oplus$ is the binary operation of exclusive ORing)

In an alternative embodiment, the random number can be assigned as CC_Y and the result of the operation can be HC_X.

The splits HC_X and CC_Y are then stored in host 12 and portable device 10, respectively. Creating and storing the splits in this manner allows the home host to be used to access the data stored on portable device 10 at any time. When portable device 10 is connected to home host 12 the encryption key can be recreated using:

$$CC\_Y \oplus HC\_X = KEY.$$

The matching pair of splits makes home host 12 a current host for portable device 10. Desirably, processes (not shown) may cause the splits to expire, either after a set period of time, or after a certain period of inactivity for enhanced security.

Home host 12 is thus set up to interface with portable device 10. Now, the process further sets up home host 12 to allow the initialization of new hosts 14 as current hosts. Thus, a task 56 follows task 54 and involves obtaining a user password. The password is used in a task 58 to create and store a portable password-modified split and a home host password-modified split represented by HC_PW and CC_PW, respectively. This involves the process of:
1. Picking a random binary number and assigning that number as HC_PW, and
2. Performing the operation of $PW \oplus KEY \oplus HC\_PW = CC\_PW$.

Creating password-modified splits in this manner allows the encryption key to be recreated using the operation:

$$PW \oplus HC\_PW \oplus CC\_PW = KEY.$$

The password modified splits HC_PW and CC_PW are then stored in home host 12 and portable device 10, respectively. Home host 12 is a home host because it stores a home host password-modified split (HC_PW).

Next, a task 60 washes the memory of portable device 10 and home host 12. To preserve data security, the encryption key, decrypted data, password, and splits are washed from the memory of portable device 10. The remaining items should be the HC_X and HC_PW splits in home host 12, encrypted data, and the CC_Y and CC_PW splits in portable device 10.

When these tasks are accomplished, the data are stored in an encrypted form, with both regular and password-modified splits stored in portable device 10 and home host 12. The system is then ready to access data with home host 12 and to initialize new hosts 14 (see FIG. 1) as current hosts.

Figure 3:
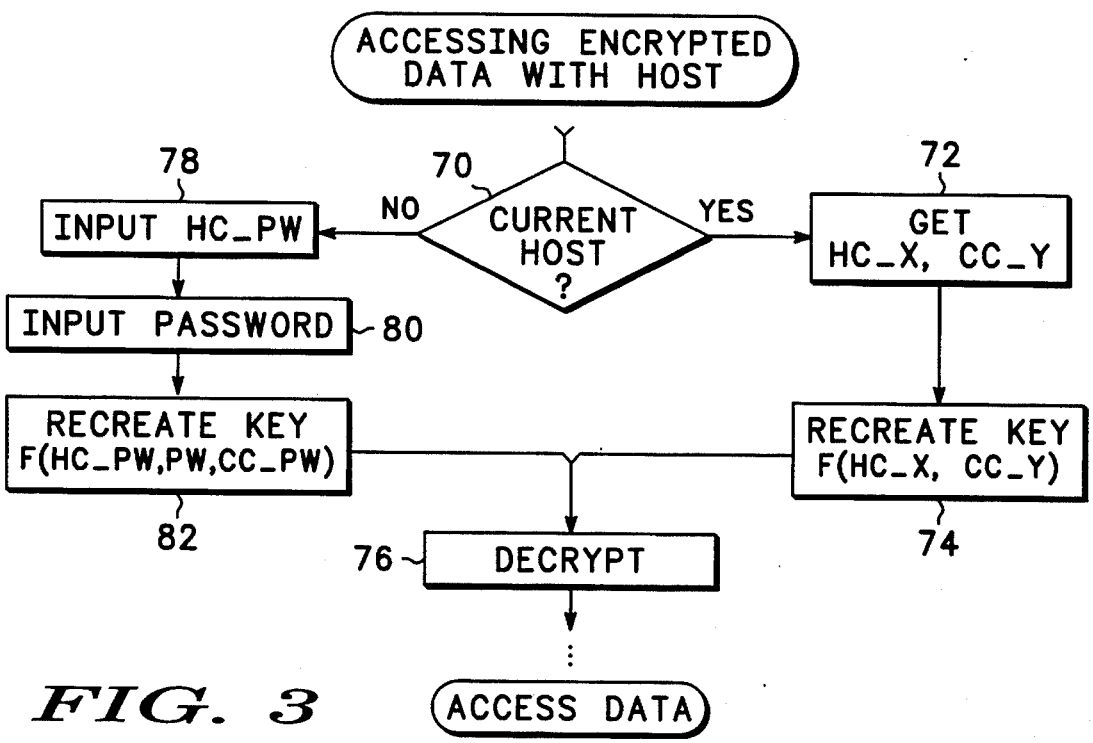
FIG. 3 is a flow diagram illustrating an encrypted data access process.

Turning now to FIG. 3, a flow diagram illustrating an encrypted data access process is shown. FIG. 3 illustrates a process for accessing data from portable encryption device 10 using a current or new host 14. Initially, portable device 10 is inserted into or connected with the current or new host 14. Device 10 then performs a query task 70, to determine whether this host is a current host or whether it is a new host. A new host 14 is a host that has not yet been set up as a current host. If this host is a current host, the host will contain a host split (HC_X) that corresponds to a portable split (CC_Y) on portable device 10, as shown for home host 12 (see FIG. 1).

If this host is a current host, a task 72 gets the HC_X and CC_Y from their respective storage locations in the host and portable device 10. In a subsequent task 74, the encryption key is recreated using the CC_Y and HC_X. The recreation technique would vary depending upon the technique used to originally split the key, but using the example above, the key could be recreated using the relationship:

$$HC\_X \oplus CC\_Y = KEY.$$

After the key has been recreated, a task 76 decrypts the data in encrypted database 26 (see FIG. 1). In the preferred embodiment the decrypted data are then stored in another location on portable device 10, such as decrypted database 28 (see FIG. 1). In another embodiment (not shown) the decrypted data may be stored on the host device.

Going back to task 70, if the host is not a current host then it is a new host 14 and must be initialized before the data can be accessed. For a new host 14, a task 78 obtains or inputs the home host password-modified split (HC_PW) from home host 12. In order to initialize a new host HC_PW must be transferred to new host 14 and portable device 10. The HC_PW can be sent to new host 14 by a variety of means, such as by a modem, e-mail, or by a floppy disk. Additional security may be provided by controlling when the HC_PW will be sent out. For example, restrictions may be placed on times and types of transmission, and additional forms of user and terminal authentication could be used. Because HC_PW has been modified by a password, it can be sent to new host 14 over a non-secure channel. An illegitimate possessor of portable device 10 could intercept the transmission of the HC_PW but would still be unable to recreate the key or access the data on portable device 10 because the illegitimate possessor would not know the password.

Next, a task 80 inputs or otherwise obtains the password from a user. Typically, portable device 10 or new host 14 will prompt the user at this time to enter the password. If new host 14 is a computer or telephone for example, the password may be entered through the new host's keyboard or key pad. If portable device 10 is a laptop computer, the password may be entered directly into portable device 10.

In a subsequent task 82, the encryption key is recreated CC_PW stored in portable device 10. The recreation technique will vary depending upon the process used to create the various splits. Using the example above, the encryption key can be recreated using the relationship:

$$HC\_PW \oplus CC\_PW \oplus PW = KEY.$$

Once the key has been recreated, the encrypted data in database 26 (see FIG. 1) can then be decrypted according to task 76. The data are now available for access and use.

In some applications changing the splits HC_X and CC_Y after each data access session may be desirable for enhanced security. In such applications, new splits may be created and stored on portable device 10 and host 14 after decryption. Likewise, passwords may be changed after each data access session.

Figure 4:
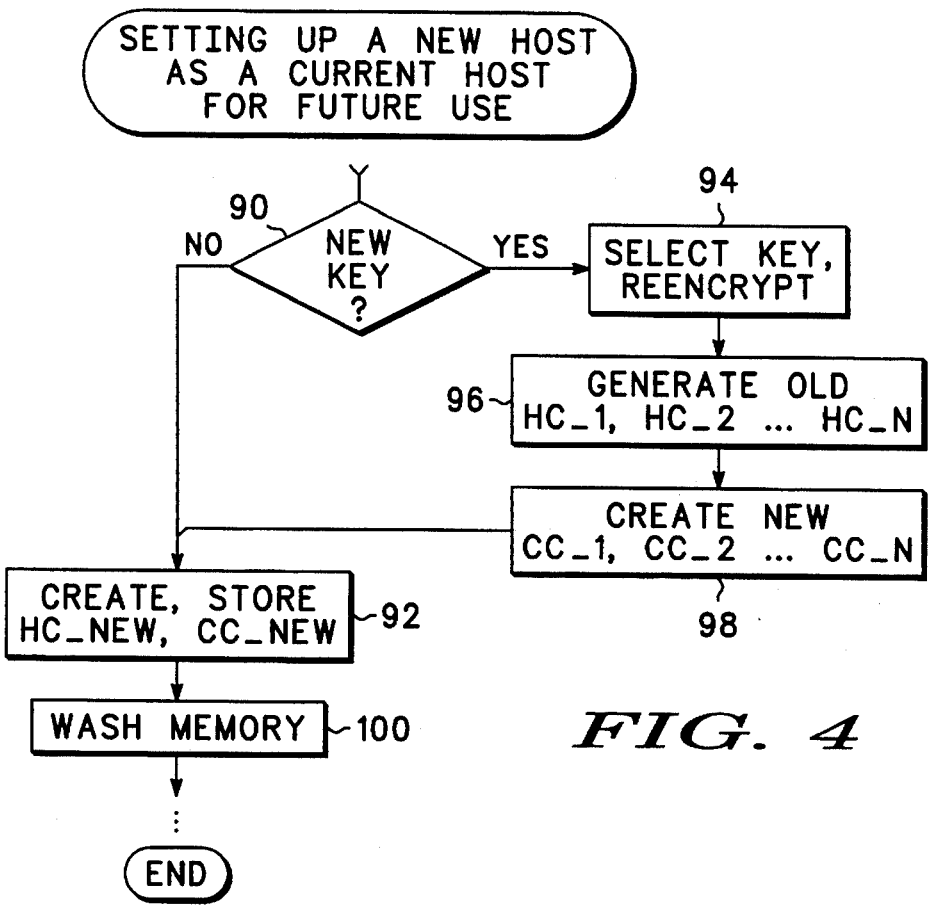
FIG. 4 is a flow diagram illustrating a process for setting up a new host.

Turning now to FIG. 4, a flow diagram illustrating a process for setting up a new host 14 as a current host is shown. The process depicted in FIG. 4 is performed after completion of the process discussed above in connection with FIG. 3. Referring to FIG. 1, new host 14 can be configured as a current host so that portable device 10 can be used with new host 14 at a later time without having to go through the time consuming and possibly unsuccessful process of getting the home host password-modified split and the password from the user.

When setting up new host 14 as a current host, the data may be re-encrypted using a new encryption key as an added security measure. This option is represented by a query task 90. However, those skilled in the art will appreciate that systems may be configured so that every time a current host is established re-encryption takes place, or so that re-encryption occurs only upon user request.

If re-encryption is not desired, the process of setting up the new host as a current host for future use is accomplished by a task 92. Task 92 involves reducing the encryption key into a new host split (HC_NEW) and a new portable split (CC NEW) and storing the new splits on new host 14 and portable device 10, respectively. These splits can be produced in the same manner used in the original encryption and creation of the home host, discussed above in connection with task 54 (see FIG. 2). Specifically, the splits can be created so that:

$$HC\_NEW \oplus CC\_NEW = KEY.$$

After the splits are stored, new host 14 becomes a current host. Anytime this current host is used with this portable device 10, these splits can be used to recreate the encryption key and decrypt the data.

Returning to task 90, if a new encryption key is needed, then task 94 first selects a new key. Typically, this key is a random binary number having a substantial number of bits. Task 94 also re-encrypts the data using this new key.

Because the encryption key has been changed, host splits (HC_X) stored at the various hosts 12, and the portable splits (CC_Y) stored on portable device 10 can no longer be combined to recreate the key. In effect, no other host remains a current host. If it is desired to keep some of the various hosts as current hosts, then their splits need to be updated. This may be accomplished without having to change the various host splits stored at the hosts.

In a task 96 the various host splits are regenerated using the old encryption key and the old portable splits (OLD CC_Y). Using the example above, host splits are regenerated using:

$$OLD\ KEY \oplus OLD\ CC\_Y = HC\_X.$$

Once host splits have be recreated, a task 98 creates a new portable split (NEW CC_Y) for each host that is to remain current using a relationship such as:

$$NEW\ KEY \oplus HC\_X = NEW\ CC\_Y.$$

Task 98 also stores the new CC_Y splits on portable device 10. All the hosts that have a new CC Y created for them can be used to access the data that have been encrypted using the new key. In this manner the data has been re-encrypted, but any or all of the former current hosts may remain current hosts without engaging in data communication with the current hosts.

After updating the portable splits for other hosts, task 92 creates a host split and portable split for this host and portable device, making this host a current host. Again task 92 involves reducing the encryption key into a new host split (HC_NEW) and a new portable split (CC_NEW). The splits can be created such that:

$$HC\_NEW \oplus CC\_NEW = NEW\ KEY.$$

Anytime the new host is used after the splits are created this relationship allows the key to be recreated and the data decrypted. Any number of hosts may be configured to access data with a particular portable device 10. Likewise, any number of portable devices 10 may be configured to access data with a particular host.

In addition, new host 14 may be configured as a home host 12 by simply storing a home host password-modified split. This home host password-modified split could be identical to that stored at other home hosts 12, or it could be a different split, with possibly a different password. While there is no limit to the number of hosts that could configured as a home host 12, security concerns may encourage the establishment of one central home host 12 for all portable devices 10, and not allow the creation of any new home hosts 12.

After task 92, an optional task 100 washes the memories of portable device 10 and host 14 such that only the proper splits are stored in the proper devices. Specifically, portable device 10 will store the CC_PW, a CC_Y for each host 12 or 14 that is to remain current, and a CC_NEW for the new current host 14. Host 14 will store a HC_NEW for this portable device 10, and additional HC_X for any additional portable devices 10 that have been set up. All copies of other host components or of the keys are desirably washed.

Figure 5:
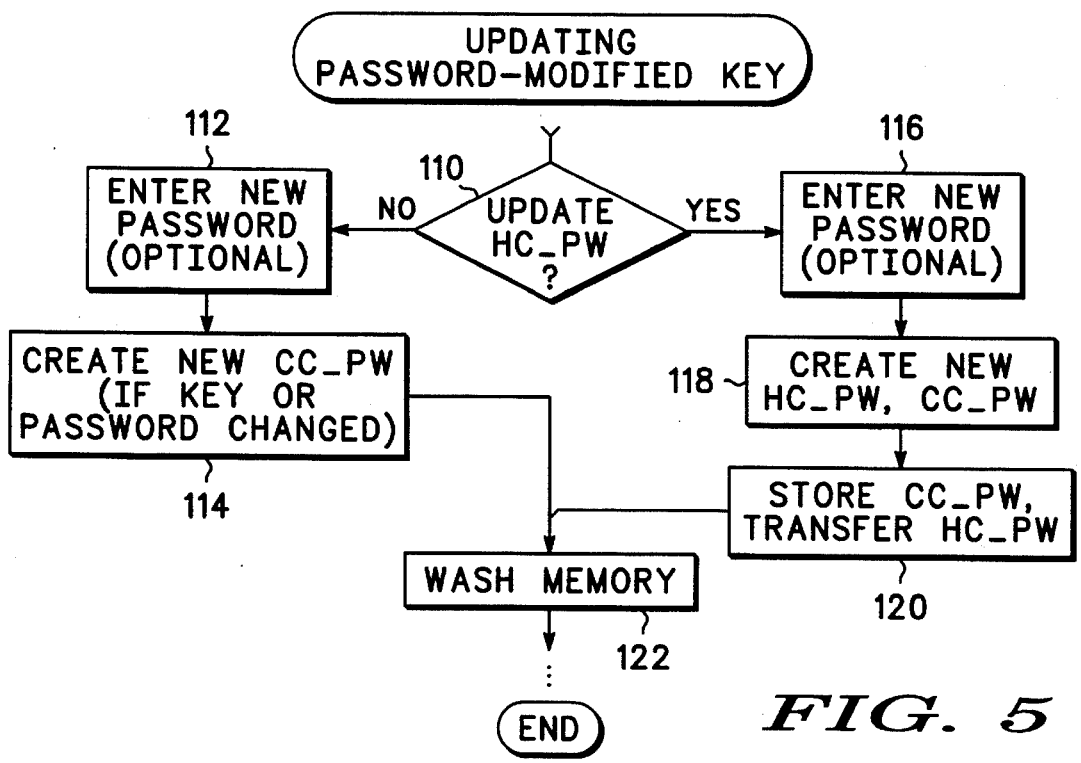
FIG. 5 is a flow diagram illustrating a process of updating a password-modified key.

Turning now to FIG. 5, a flow diagram illustrating a process of updating a password-modified key is shown. FIG. 5 is an optional process which need not be performed, but when it is performed it occurs after the process discussed above in connection with FIG. 4. When this FIG. 5 process is performed, optional task 100 (see FIG. 4) is omitted so that the memories of portable device 10 and host 10 will not be washed prior to beginning the FIG. 5 process.

A query task 110 decides whether to update host password-modified split (HC_PW). In some systems it may be desirable to update the HC_PW every time a new host has been initialized. If the HC_PW is updated with each initialization, then it is assured that only the current key combination will work. In other systems it may be desirable to change the HC_PW only when there is evidence of a security breach.

If task 110 decides not to update HC_PW, a task 112 obtains a new password. Those skilled in the art will appreciate that the system could be designed to force a new password each time a new host 14 has been initialized or each time the data has been accessed using the password modified key.

After task 112, a task 114 updates the portable password-modified split (CC_PW) if either the password or encryption key has been changed. Such changes may have taken place, for example, as part of the process of setting up a new host 14 for future use, as illustrated in FIG. 4. If only the password has been changed then:

$$HC\_PW \oplus NEW\ PW \oplus OLD\ KEY = NEW\ CC\_PW.$$

If only the encryption key has been changed then:

$$HC\_PW \oplus NEW\ KEY \oplus OLD\ PW = NEW\ CC\_PW.$$

If both the password and encryption key have been changed then:

$$HC\_PW \oplus NEW\ KEY \oplus NEW\ PW = NEW\ CC\_PW.$$

Updating CC_PW in any of these ways allows the old HC_PW stored in home host 12 to be used to initialize another new host 14 in combination with the new password, new key and/or new CC_PW.

Returning now to task 110, if a decision is made to update the home host password-modified split (HC_PW) then a task 116 obtains a new password. Those skilled in the art will appreciate that the system could be designed to force a new password each time a new host 14 has been initialized or each time the data has been accessed using the password-modified key.

Next, a task 118 creates a new HC_PW and a new CC_PW. Typically, one of HC_PW or CC_PW is a random binary number. For example, if HC_PW is a random binary number, then the new CC_PW may be configured using:

$$NEW\ HC\_PW \oplus KEY \oplus PW = NEW\ CC\_PW,$$

(where the key and password could either be the original or could have been updated in a process such as illustrated in FIG. 4).

After task 118, a task 120 stores the new CC_PW in portable device 10 and transfers the new HC_PW back to home host 12. The transfer back of HC_PW to home host 12 may be accomplished by using any conventional non-secure or secure data transfer technique. Next, a task 122 washes the memory of all copies of the encryption key, password and splits, except for the CC_PW stored in portable device 10 and the HC_PW stored home host 12.

In summary, a method for providing portable, encrypted data that are capable of being accessed with multiple hosts has been described. These multiple hosts include new hosts that can be easily configured without requiring a secure communication channel between the new hosts and home hosts. Once the new host has been configured, subsequent access to the encrypted data is permitted on the new host without establishing a communication channel with a home host.

The system has a wide range of applications. For example, the system could be used in connection with providing secure communication. In this application, the hosts may be configured as communication devices, such as secure telephones. The portable devices could be small cards, such as PCMCIA cards or entire laptop computers. The encrypted data could be the necessary cryptographic algorithms and key variables used to establish secure communication.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for providing access through a new host to encrypted data using an encryption key, wherein a first split of a password-modified key is stored in a portable encryption device, and a second split of said password-modified key is stored elsewhere, said method comprising the steps of:

a) connecting said portable encryption device to said new host;

b) providing a password;

c) obtaining said second split of said password-modified key; and d) recreating said encryption key with said password to produce a recreated encryption key, first split of said password-modified key, and said second split of said password-modified key.

2. A method as claimed in claim 1 further comprising the step decrypting said encrypted data using said recreated encryption key.

3. A method as claimed in claim 1 further comprising the steps of:

determining whether said new host has been previously initialized; and performing said step c) if said new host has not been previously initialized.

4. A method as claimed in claim 1 wherein said encryption key has been reduced into a portable split which is stored in said portable encryption device and a home host split which is stored in a home host, and said method further comprising the steps of:

e) recreating said home host split of said encryption key for a previously initialized host to produce a recreated home host split;

f) selecting a new encryption key;

g) re-encrypting said encrypted data using said new encryption key; and h) creating a new portable split of said new encryption key, said new portable split being configured as a function of said new encryption key and said recreated home host split of said encryption key for said previously initialized host.

5. A method as claimed in claim 1 further comprising the steps of:

e) changing said first split of said password-modified key into an updated first split; and f) storing said updated first split in said portable encryption device.

6. A method as claimed in claim 5 wherein said step e) comprises the steps of:

changing said second split of said password-modified key to an updated second split of said password-modified key;

selecting a random binary number; and exclusive ORing said random binary number with said encryption key and with said password.

7. A method as claimed in claim 5 wherein said step e) comprises the steps of:

changing said password to produce a changed password; and exclusive ORing said changed password with said second split of said password-modified key and with said encryption key.

8. A method for providing portable encrypted data which are accessible by multiple hosts without requiring a secure communication link between an existing host and a new host, said method comprising the steps of:

a) encrypting data using an encryption key;

b) storing said portable encrypted data in a portable device;

c) obtaining a user password;

d) reducing said user password and said encryption key into a portable password-modified split and a home host password-modified split; and e) storing said home host password-modified split in a home host.

9. A method as claimed in claim 8 additionally comprising the steps of:

f) separating said portable device from said home host; and g) refraining from storing said home host password-modified split in said portable device after the step of separating.

10. A method as claimed in claim 8 wherein the step of encrypting further comprises the steps of:

reducing said encryption key into a portable split and a home host split;

storing said portable split in said portable device; and storing said home host split in said home host.

11. A method as claimed in claim 8 wherein said step d) comprises the steps of:

selecting a random binary number; and exclusive ORing said random binary number with said encryption key and said user password.

12. A portable data encryption device comprising:

a) first data storage area;

b) an encryption device configured to perform encryption and decryption in response to an encryption key, to encrypt data for storage in said first data storage area, and to decrypt data stored in said first data storage area;

c) a logical device in data communication with said encryption device, said logical device being configured to combine a password with said encryption key to form a password-modified encryption key; and d) a second data storage area in data communication with said logical device, said second data storage area being configured to store a first split of said password-modified encryption key.

13. An encryption device as claimed in claim 12 wherein:

said encryption device additionally comprises a third data storage area in data communication with said encryption device, said third data storage area being configured as volatile memory;

said first data storage area is configured as non-volatile memory; and said encryption device is configured to place decrypted data in said third data storage area.

14. An encryption device as claimed in claim 12 wherein said logical device is further configured to reduce said password-modified encryption key into said first split of said password-modified encryption key and a second split of said password-modified encryption key.

15. A system for providing portable encrypted data which are accessible by multiple hosts, wherein said system configures new hosts without requiring a secure link between hosts and said system comprises:

a) a portable encryption device configured to encrypt, store, and decrypt data, wherein said data are encrypted and decrypted in response to an encryption key, and said portable encryption device is further configured to store a first split of a password-modified key; and b) a home host configured to engage in data communication with said portable encryption device, and to store a second split of said password-modified key.

16. A system as claimed in claim 15 wherein:

said portable data encryption device is further configured to additionally store a first split of said encryption key; and said home host is further configured to additionally store a second split of said encryption key.

17. A system as claimed in claim 15 wherein said home host is configured as a telecommunications device.

18. A system as claimed in claim 15 wherein said portable encryption device is further configured to reduce said password-modified key into said first split of said password-modified key and a second split of said password-modified key.

* * * * *